(12) United States Patent
Wu et al.

(10) Patent No.: US 12,449,667 B2
(45) Date of Patent: Oct. 21, 2025

(54) OPTICAL ELEMENT DRIVING MECHANISM

(71) Applicant: TDK TAIWAN CORP., Taoyuan (TW)

(72) Inventors: Tso-Hsiang Wu, Taoyuan (TW); Chao-Chang Hu, Taoyuan (TW); Yung-Yun Chen, Taoyuan (TW); Ya-Hsiu Wu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 168 days.

(21) Appl. No.: 18/468,177

(22) Filed: Sep. 15, 2023

(65) Prior Publication Data

US 2024/0094600 A1 Mar. 21, 2024

Related U.S. Application Data

(60) Provisional application No. 63/406,916, filed on Sep. 15, 2022.

(51) Int. Cl.
| | |
|---|---|
| *G02B 27/01* | (2006.01) |
| *F21V 8/00* | (2006.01) |
| *G02B 7/08* | (2021.01) |
| *G02B 7/36* | (2021.01) |
| *G02B 27/64* | (2006.01) |
| *G03B 5/00* | (2021.01) |
| *G06F 3/01* | (2006.01) |
| *G09G 3/00* | (2006.01) |
| *H01F 7/08* | (2006.01) |
| *H04N 23/54* | (2023.01) |
| *H04N 23/55* | (2023.01) |
| *H04N 23/68* | (2023.01) |

(52) U.S. Cl.
CPC ....... *G02B 27/0176* (2013.01); *G02B 6/0006* (2013.01); *G02B 6/0028* (2013.01); *G02B 7/08* (2013.01); *G02B 7/36* (2013.01); *G02B 27/0172* (2013.01); *G02B 27/0179* (2013.01); *G02B 27/646* (2013.01); *G03B 5/00* (2013.01); *G06F 3/013* (2013.01); *G09G 3/001* (2013.01); *H01F 7/081* (2013.01); *H04N 23/54* (2023.01); *H04N 23/55* (2023.01); *H04N 23/6812* (2023.01); *G02B 2027/0112* (2013.01); *G02B 2027/015* (2013.01); *G02B 2027/0159* (2013.01); *G02B 2027/0178* (2013.01); *G02B 2027/0187* (2013.01); *G02B 2207/101* (2013.01); *G03B 2205/0076* (2013.01); *G09G 2354/00* (2013.01)

(58) Field of Classification Search
CPC .. G02B 27/0176; G02B 27/0179; G03B 5/00; G03B 2217/00; H04N 23/55
USPC .......................................................... 396/55
See application file for complete search history.

(56) References Cited

U.S. PATENT DOCUMENTS

2011/0217029 A1* 9/2011 Wu .................. G03B 17/00
396/55

* cited by examiner

Primary Examiner — Minh Q Phan
(74) Attorney, Agent, or Firm — MUNCY, GEISSLER, OLDS & LOWE, P.C.

(57) ABSTRACT

An optical element driving mechanism is provided and includes a fixed assembly, a movable assembly and a first driving assembly. The movable assembly is movable relative to the fixed assembly. The first driving assembly is configured to drive the movable assembly to move relative to the fixed assembly. The optical element driving mechanism further includes a first opening, and an external light beam travels along a first axis to pass through the first opening.

19 Claims, 11 Drawing Sheets

OPTICAL ELEMENT DRIVING MECHANISM

CROSS REFERENCE TO RELATED APPLICATIONS

This application claims the benefit of U.S. Provisional Application No. 63/406,916, filed Sep. 15, 2022, the entirety of which is incorporated by reference herein.

BACKGROUND OF THE INVENTION

Field of the Disclosure

The present disclosure relates to an optical element driving mechanism, and in particular it relates to an optical element driving mechanism an aperture structure.

Description of the Related Art

As technology has developed, many of today's electronic devices (such as smartphones) have a camera or video functionality. Using the camera modules disposed on electronic devices, users can operate their electronic devices to capture photographs and record videos.

Today's design of electronic devices continues to follow the trend of miniaturization, meaning that the various components of the camera module or its structure must also be continuously reduced, so as to achieve miniaturization. In general, a driving mechanism in the camera module has a camera lens holder configured to hold a camera lens, and the driving mechanism can have the functions of auto focusing or optical image stabilization. However, although the existing driving mechanism can achieve the aforementioned functions of photographing or video recording, they still cannot meet all the needs of the users.

Therefore, how to design a camera module capable of performing autofocus and optical anti-shake functions and capable of achieving miniaturization are topics nowadays that need to be discussed and solved.

BRIEF SUMMARY OF THE INVENTION

Accordingly, one objective of the present disclosure is to provide an optical element driving mechanism to solve the above problems.

According to some embodiments of the disclosure, an optical element driving mechanism is provided and includes a fixed assembly, a movable assembly and a first driving assembly. The movable assembly is movable relative to the fixed assembly. The first driving assembly is configured to drive the movable assembly to move relative to the fixed assembly. The optical element driving mechanism further includes a first opening, and an external light beam travels along a first axis to pass through the first opening.

According to some embodiments, the fixed assembly has a side wall which extends along the first axis. The side wall is adjacent to the first opening. The movable assembly includes a first movable part. The first movable part is adjacent to the side wall. The optical element driving mechanism further includes a second movable part which is adjacent to the side wall.

According to some embodiments, the first movable part is movable relative to the fixed assembly. The second movable part is movable relative to the first movable part. The second movable part is movable relative to the fixed assembly. When viewed along the first axis, the first movable part overlaps at least a portion of the second movable part. When viewed along the first axis, the side wall surrounds the first opening.

According to some embodiments, the first movable part has a second opening, and the light beam passes through the second opening. When viewed along the first axis, the second opening and an opening center define a first shortest distance. The second movable part has a third opening, and the light beam passes through the third opening. When viewed along the first axis, the third opening and the opening center define a second shortest distance. The first shortest distance is different from the second shortest distance. The first shortest distance is greater than the second shortest distance.

According to some embodiments, the first movable part further has a first ring structure, and the second opening is formed by the first ring structure. The first ring structure surrounds the side wall. The second movable part further has a second ring structure, and the third opening is formed by the second ring structure. The second movable part further has a first protruding portion extending from the second ring structure toward the side wall. When viewed along the first axis, a portion of the first protruding portion does not overlap the first movable part.

According to some embodiments, the first driving assembly includes a first circuit member which is disposed at the fixed assembly. The first driving assembly further includes a first driving element and a grounding member. A first end of the first driving element is affixed to a first connecting end of the first circuit member. The first connecting end is located at the fixed assembly. A second end of the first driving element is affixed to a second connecting end of the grounding member. The second connecting end is located at the first movable part.

According to some embodiments, the first driving assembly further includes a second circuit member and a second driving element. The second circuit member is disposed at the second movable part. A third end of the second driving element is affixed to a third connecting end of the grounding member. The third connecting end is located at the first movable part. A fourth end of the second driving element is affixed to a fourth connecting end of the second circuit member. The fourth connecting end is located at the second movable part.

According to some embodiments, when viewed along the first axis, a distance between the first connecting end and the fourth connecting end is greater than a distance between the second connecting end and the third connecting end. When viewed along the first axis, a distance between the first connecting end and the third connecting end is greater than the distance between the second connecting end and the third connecting end. When viewed along the first axis, a distance between the second connecting end and the fourth connecting end is greater than the distance between the second connecting end and the third connecting end.

According to some embodiments, the first driving assembly further includes a third circuit member which is disposed at the fixed assembly. The first driving assembly further includes a third driving element. A fifth end of the third driving element is affixed to a fifth connecting end of the third circuit member. The fifth connecting end is located at the fixed assembly. A sixth end of the third driving element is affixed to a sixth connecting end of the grounding member. The sixth connecting end is located at the first movable part.

According to some embodiments, the first driving assembly further includes a fourth circuit member and a fourth driving element. The fourth circuit member is disposed at the second movable part. A seventh end of the fourth driving element is affixed to a seventh connecting end of the grounding member. The seventh connecting end is located at the first movable part. An eighth end of the fourth driving element is affixed to an eighth connecting end of the fourth circuit member. The eighth connecting end is located at the second movable part.

According to some embodiments, when viewed along the first axis, a distance between the fifth connecting end and the eighth connecting end is greater than a distance between the sixth connecting end and the seventh connecting end. When viewed along the first axis, a distance between the fifth connecting end and the seventh connecting end is greater than the distance between the sixth connecting end and the seventh connecting end. When viewed along the first axis, a distance between the sixth connecting end and the eighth connecting end is greater than the distance between the sixth connecting end and the seventh connecting end.

According to some embodiments, the optical element driving mechanism further includes a circuit assembly which is electrically connected to the first driving assembly. The first circuit member further has a first electrical connection terminal which is electrically connected to the circuit assembly. The second circuit member further has a second electrical connection terminal which is electrically connected to the circuit assembly. When the circuit assembly provides power to the first circuit member and the first driving element through the first electrical connection terminal, the first driving element drives the first movable part to rotate in a first rotating direction relative to the fixed assembly. When the circuit assembly provides power to the second circuit member and the second driving element through the second electrical connection terminal, the second driving element drives the second movable part to rotate in the first rotating direction relative to the first movable part.

According to some embodiments, the third circuit member further has a third electrical connection terminal which is electrically connected to the circuit assembly. The fourth circuit member further has a fourth electrical connection terminal which is electrically connected to the circuit assembly. When the circuit assembly provides power to the third circuit member and the third driving element through the third electrical connection terminal, the third driving element drives the first movable part to rotate in a second rotating direction relative to the fixed assembly. The second rotating direction is opposite to the first rotating direction. When the circuit assembly provides power to the fourth circuit member and the fourth driving element through the fourth electrical connection terminal, the fourth driving element drives the second movable part to rotate in the second rotating direction relative to the first movable part.

According to some embodiments, the optical element driving mechanism further includes a preload assembly, and the preload assembly includes a first preload member configured to generate a first preload force to the second movable part. When the first driving assembly does not drive the second movable part to move, the first preload force causes the second movable part to be located in a second initial position. One end portion of the first preload member is connected to the first electrical connection terminal. The other end portion of the first preload member is connected to the second electrical connection terminal. The preload assembly further includes a second preload member configured to generate a second preload force to the second movable part. When the first driving assembly does not drive the second movable part to move, the second preload force causes the second movable part to be located in the second initial position. One end portion of the second preload member is connected to the third electrical connection terminal. The other end portion of the second preload member is connected to the fourth electrical connection terminal. The preload assembly further includes a third preload member configured to generate a third preload force to the first movable part. When the first driving assembly does not drive the first movable part to move, the third preload force causes the first movable part to be located in a first initial position. The fixed assembly further includes a first base and a fixed member. The fixed member is located at the first base. One end portion of the third preload member is connected to a first elastic connecting end of the ground member. The other end portion of the third preload member is connected to a second elastic connecting end of the fixed member. The first preload member, the second preload member and the third preload member each have a plate-shaped structure. Each of the first preload member, the second preload member and the third preload member is an elastic spring sheet.

According to some embodiments, the first connecting end, the first driving element and the second connecting end form a first circuit loop. The fourth connecting end, the second driving element and the third connecting end form a second circuit loop. The first preload member is made of metal material. The first electrical connection terminal of the first circuit member is electrically connected to the second electrical connection terminal of the second circuit member through the first preload member. The fifth connecting end, the third driving element and the sixth connecting end form a third circuit loop. The eighth connecting end, the fourth driving element and the seventh connecting end form a fourth circuit loop. The second preload member is made of metal material. The third electrical connection terminal of the third circuit member is electrically connected to the fourth electrical connection terminal of the fourth circuit member through the second preload member. The third preload member is made of metal material. The third preload member is electrically independent of the first preload member and the second preload member.

According to some embodiments, the optical element driving mechanism further includes a guiding assembly configured to guide the second movable part to move relative to the first base. The first base has a first groove. The second movable part has a second groove. The guiding assembly has a first guiding member which is disposed between the first groove and the second groove. The first guiding member has a spherical structure.

According to some embodiments, the first guiding member is configured to contact a first inner wall of the first groove and a second inner wall, a third inner wall and a fourth inner wall of the second groove. A size of the first groove is different from a size of the second groove when viewed along the first axis. When viewed along the first axis, the size of the first groove is larger than the size of the second groove. When viewed along the first axis, a portion of the second groove is located within the first groove. The optical element driving mechanism further includes a covering plate which is fixedly disposed on the first base. When viewed along the first axis, the covering plate overlaps at least a portion of the first guiding member.

According to some embodiments, the preload assembly further includes a fourth preload member. The fourth preload member has a spiral structure. The fourth preload member is disposed in the first groove and adjacent to the first guiding member. The second movable part has two first protruding portions extending toward the first base. The second groove is formed by the two first protruding portions. One end portion of the fourth preload member is in contact with the first base, and the other end portion of the fourth preload member is in contact with one of the two first protruding portions. When viewed in a direction perpendicular to the first axis, the fourth preload member overlaps at least a portion of the guiding assembly. When viewed a direction perpendicular to the first axis, the fourth preload member overlaps at least a portion of the first guiding member.

According to some embodiments, the optical element driving mechanism further includes a sensing assembly configured to sense movement of the movable assembly relative to the fixed assembly. The sensing assembly includes a first sensing element and a second sensing element. The first sensing element is fixedly disposed on the circuit assembly. The circuit assembly is fixedly disposed on the first base. The second sensing element is fixedly disposed on the second movable part. The first sensing element is configured to sense changes of the second sensing element.

According to some embodiments, when viewed along a radial direction, the first movable part forms a first receiving groove configured to accommodate the second sensing element. When viewed along the radial direction, a size of the first receiving groove is larger than a size of the second sensing element.

The present disclosure provides an optical element driving mechanism, which includes a fixed assembly, a movable assembly, a first driving assembly, and a plurality of optical elements (the blades). The movable assembly includes a first movable part and a second movable part, and the first driving assembly is configured to drive the first movable part to move relative to the first base, and to drive the second movable part to move relative to the first movable part so as to drive the optical elements to rotate to adjust the amount of the light beam entering the optical element driving mechanism.

The first driving element and the second driving element are configured to drive the first movable part and the second movable part to rotate in the first rotating direction. The first driving element and the second driving element can be controlled simultaneously or separately. When they are controlled separately, the first opening can be closed in stages. Similarly, the third driving element and the fourth driving element are configured to drive the first movable part and the second movable part to rotate in the second rotating direction. When the third driving element and the fourth driving element are controlled separately, the first opening can be opened in stages.

In addition, the first movable part is stacked on the second movable part along the first axis, and when viewed along the first axis, the first movable part and the second movable part surround a portion of the first base, so that the optical element driving mechanism can further achieve the purpose of miniaturization. Furthermore, one or more spherical first guiding members can be disposed between the second movable part and the first base, so that the second movable part can rotate more smoothly relative to the first movable part and the first base.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
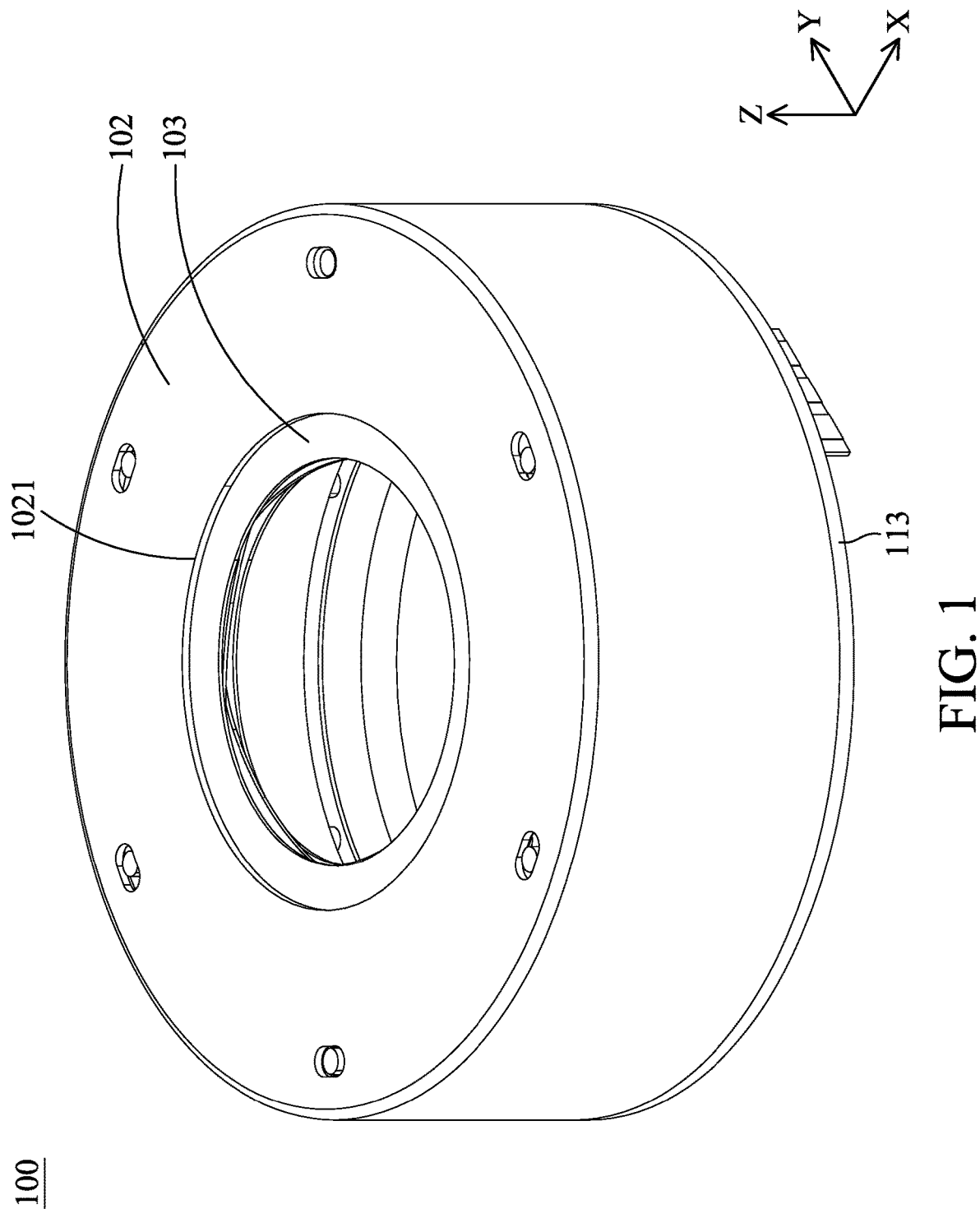
FIG. 1 is a three-dimensional schematic diagram of an optical element driving mechanism 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
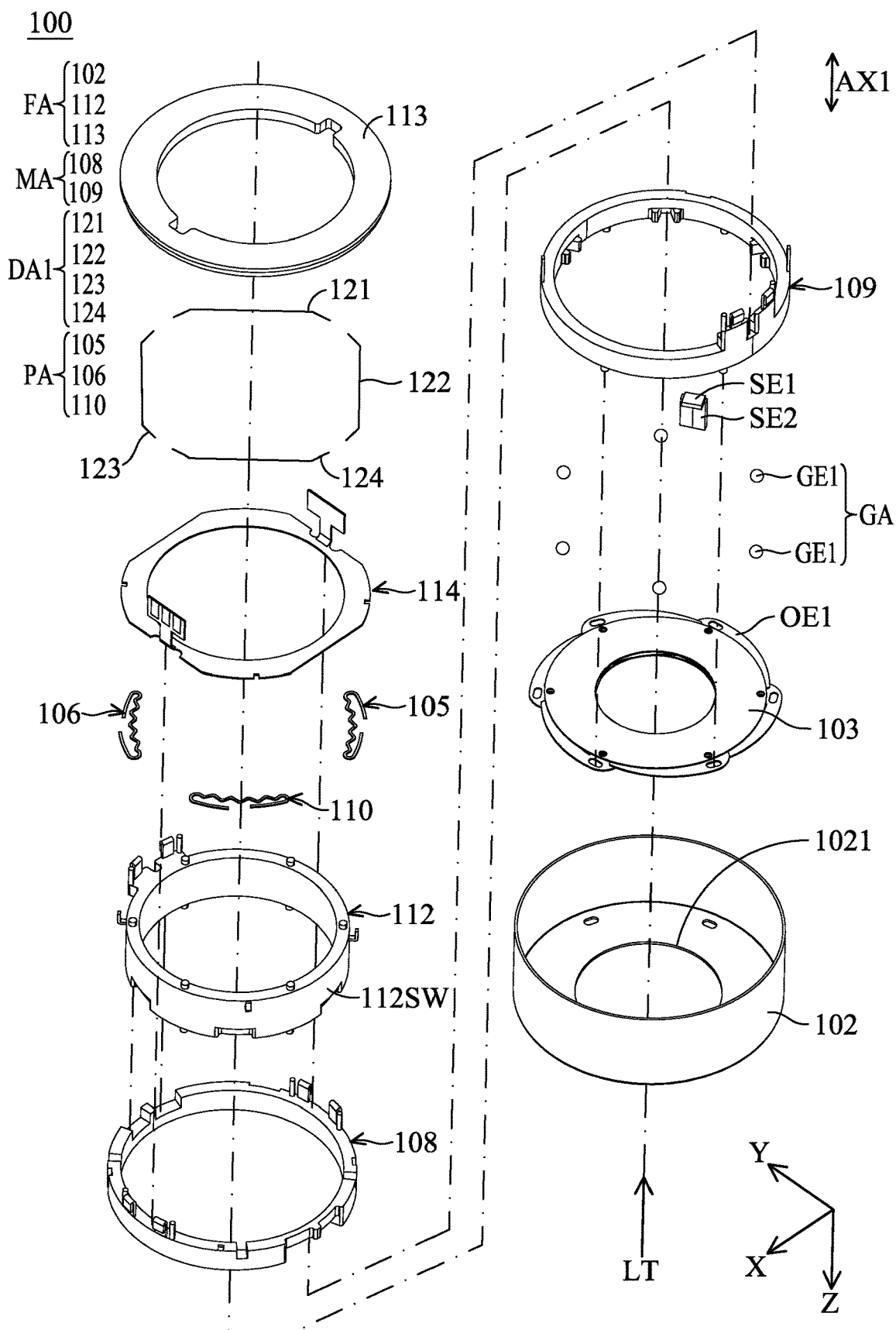
FIG. 2 is an exploded diagram of the optical element driving mechanism 100 according to an embodiment of the present disclosure.
Figure 3:
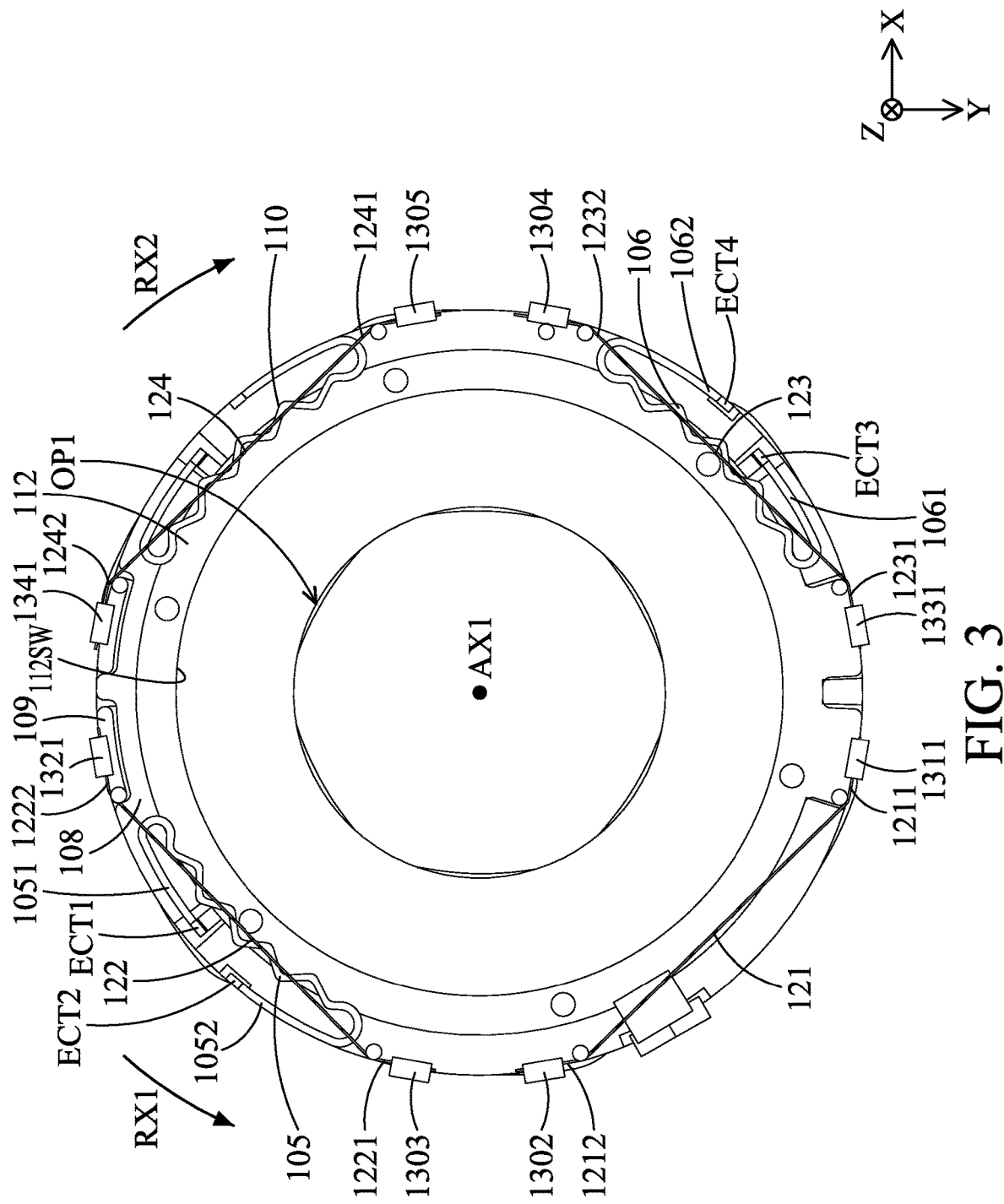
FIG. 3 is a bottom view of a partial structure of the optical element driving mechanism 100 according to an embodiment of the present disclosure.

Please refer to FIG. 1 to FIG. 3. FIG. 1 is a three-dimensional schematic diagram of an optical element driving mechanism 100 according to an embodiment of the present disclosure. FIG. 2 is an exploded diagram of the optical element driving mechanism 100 according to an embodiment of the present disclosure, and FIG. 3 is a bottom view of a partial structure of the optical element driving mechanism 100 according to an embodiment of the present disclosure. The optical element driving mechanism 100 can be an optical camera module configured to hold and drive an optical element. The optical element driving mechanism 100 can be installed on various electronic devices or portable electronic devices, such as smart phones, so that users can perform image capturing functions.

In this embodiment, the optical element driving mechanism 100 may include a fixed assembly FA, a movable assembly MA and a first driving assembly DA1. The movable assembly MA is configured to be connected to at least one optical element, and the movable assembly MA is movable relative to the fixed assembly FA. The first driving assembly DA1 is configured to drive the movable assembly MA to move relative to the fixed assembly FA.

In this embodiment, as shown in FIG. 2, the fixed assembly FA includes a casing 102, a first base 112 and a second base 113. The second base 113 is fixedly disposed on the aforementioned electronic device, the first base 112 is affixed to the second base 113, and the casing 102 is fixedly connected to the second base 113.

As shown in FIG. 2 and FIG. 3, the optical element driving mechanism 100 further includes a first opening OP1, and an external light beam LT can travel along a first axis AX1 to pass the first opening OP1. The first base 112 can be configured to hold an optical element (such as a camera lens, not shown in the figures), so that the light beam LT can pass through the first opening OP1 and the camera lens to be received by an image sensor (not shown in the figures) under the second base 113 so as to generate a digital image signal.

The first base 112 of the fixed assembly FA has a side wall 112SW extending along the first axis AX1, and the side wall 112SW is adjacent to the first opening OP1. Furthermore, the movable assembly MA may include a first movable part 108, and the first movable part 108 is adjacent to the side wall 112SW.

For example, the first movable part 108 is adjacent to the first base 112, and there is a gap between the first movable part 108 and the first base 112, which allows the first movable part 108 to move relative to the first base 112. This gap may be less than 0.1 mm, for example, but it is not limited thereto.

Furthermore, the optical element driving mechanism 100 further includes a second movable part 109 which is adjacent to the side wall 112SW. Similarly, the second movable part 109 can also be adjacent to the first base 112, and there is also a gap between the second movable part 109 and the first base 112, which allows the second movable part 109 to move relative to the first base 112. This gap may be less than 0.1 mm, for example, but it is not limited thereto.

In this embodiment, the first movable part 108 is movable relative to the fixed assembly FA, the second movable part 109 is movable relative to the first movable part 108, and the second movable part 109 is also movable relative to the fixed assembly FA.

When viewed along the first axis AX1 (the Z-axis), the first movable part 108 overlaps at least a portion of the second movable part 109. When viewed along the first axis AX1, the side wall 112SW surrounds the first opening OP1.

Figure 4:
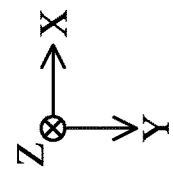
FIG. 4 is a bottom view of a partial structure of the optical element driving mechanism 100 according to an embodiment of the present disclosure.
Figure 4:
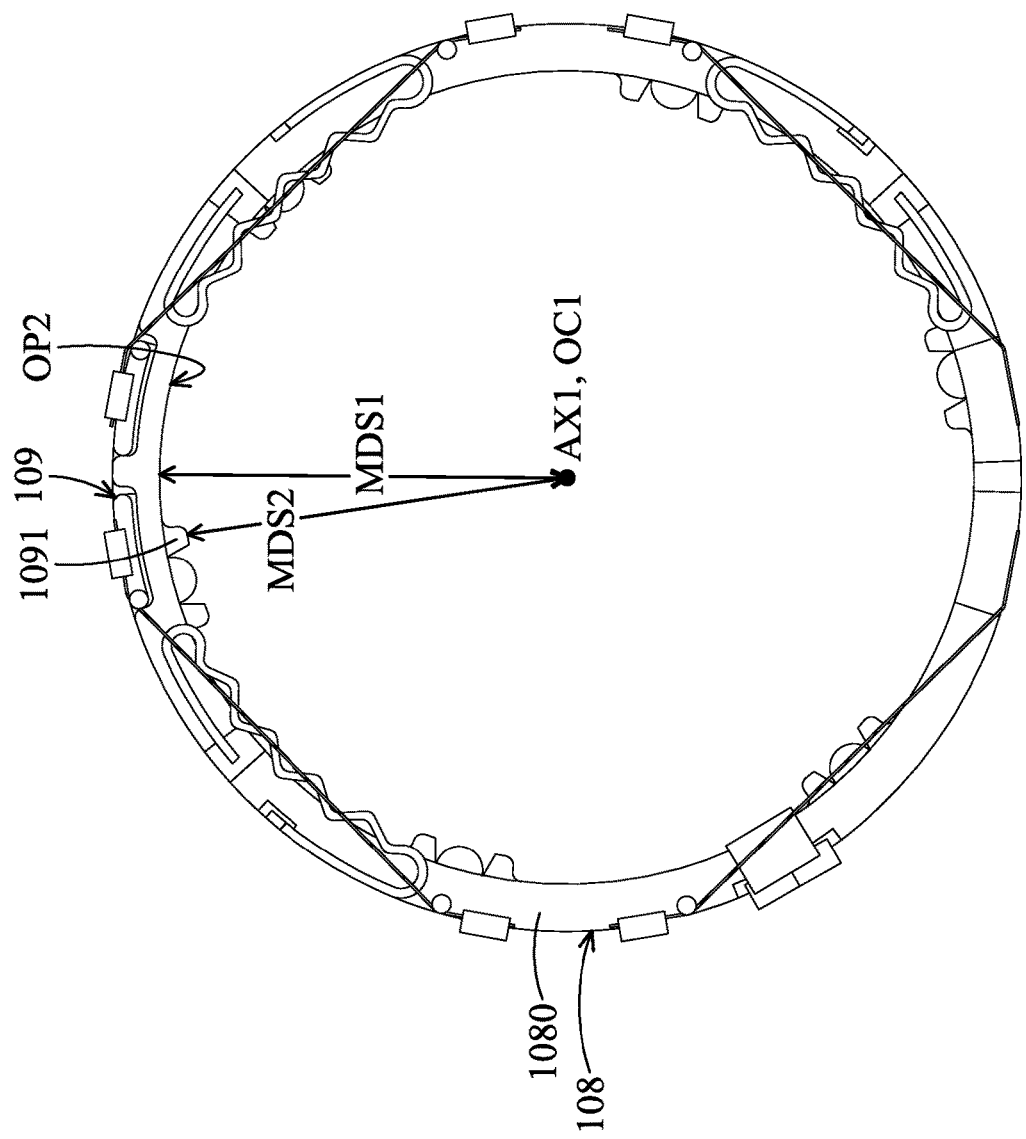
Figure 5:
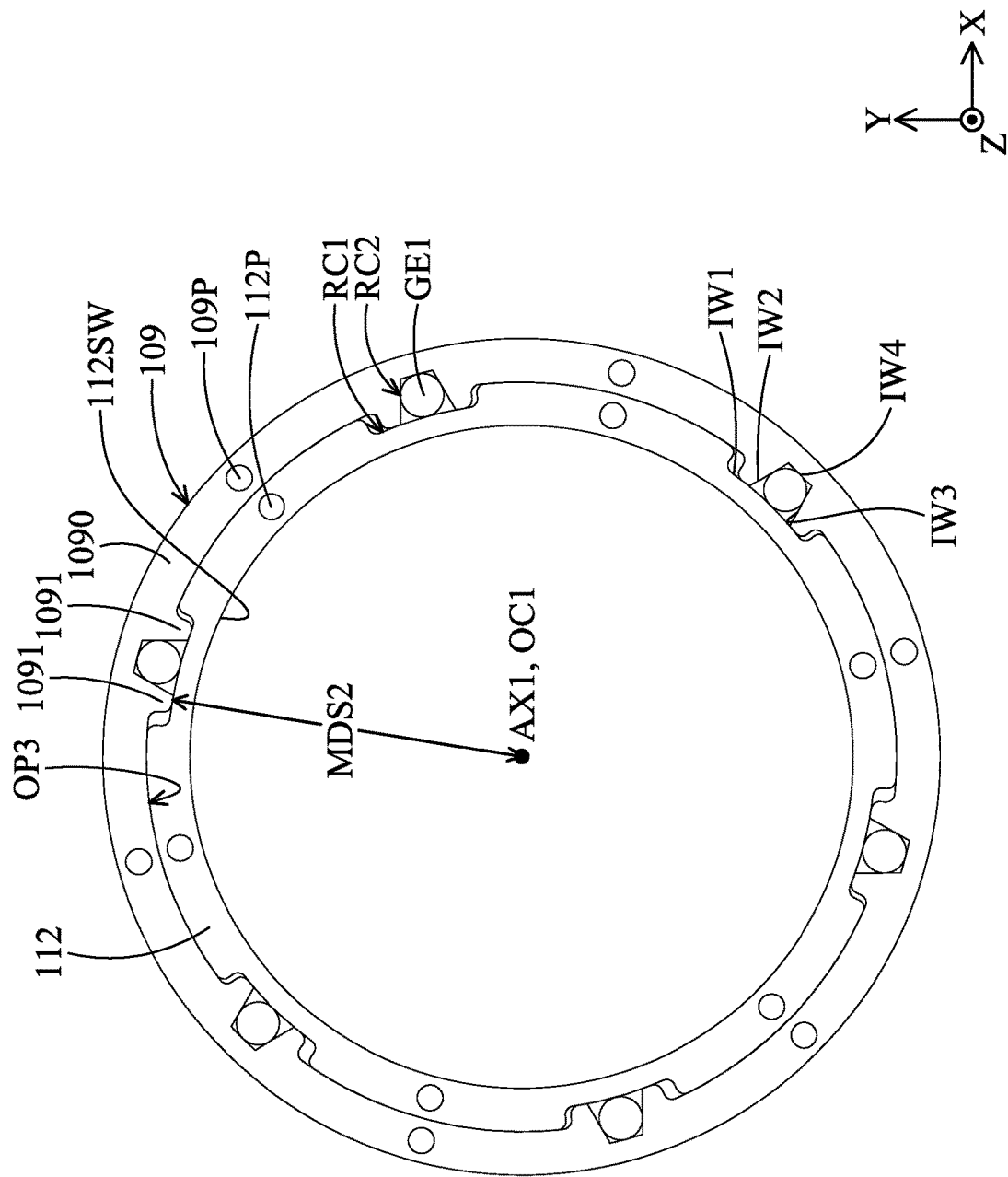
FIG. 5 is a top view of a partial structure of the optical element driving mechanism 100 according to an embodiment of the present disclosure.

Next, please refer to FIG. 3 to FIG. 5. FIG. 4 is a bottom view of a partial structure of the optical element driving mechanism 100 according to an embodiment of the present disclosure, and FIG. 5 is a top view of a partial structure of the optical element driving mechanism 100 according to an embodiment of the present disclosure. As shown in FIG. 4, the first movable part 108 has a second opening OP2, and the light beam LT can pass through the second opening OP2. When viewed along the first axis AX1, the second opening OP2 and an opening center OC1 define a first shortest distance MDS1.

Furthermore, as shown in FIG. 5, the second movable part 109 has a third opening OP3, and the light beam LT can pass through the third opening OP3. When viewed along the first axis AX1, the third opening OP3 and the opening center OC1 define a second shortest distance MDS2.

The first shortest distance MDS1 and the second shortest distance MDS2 are different. Specifically, the first shortest distance MDS1 is greater than the second shortest distance MDS2.

As shown in FIG. 3 and FIG. 4, the first movable part 108 further has a first ring structure 1080, the second opening OP2 is formed by the first ring structure 1080, and the first ring structure 1080 surrounds the side wall 112SW.

As shown in FIG. 4 and FIG. 5, the second movable part 109 has a second ring structure 1090, and the third opening OP3 is formed by the second ring structure 1090. In addition, the second movable part 109 further has two first protruding portions 1091 extending from the second ring structure 1090 toward the side wall 112SW. As shown in FIG. 4, when viewed along the first axis AX1, a portion of the first protruding portion 1091 does not overlap the first movable part 108.

Figure 6:
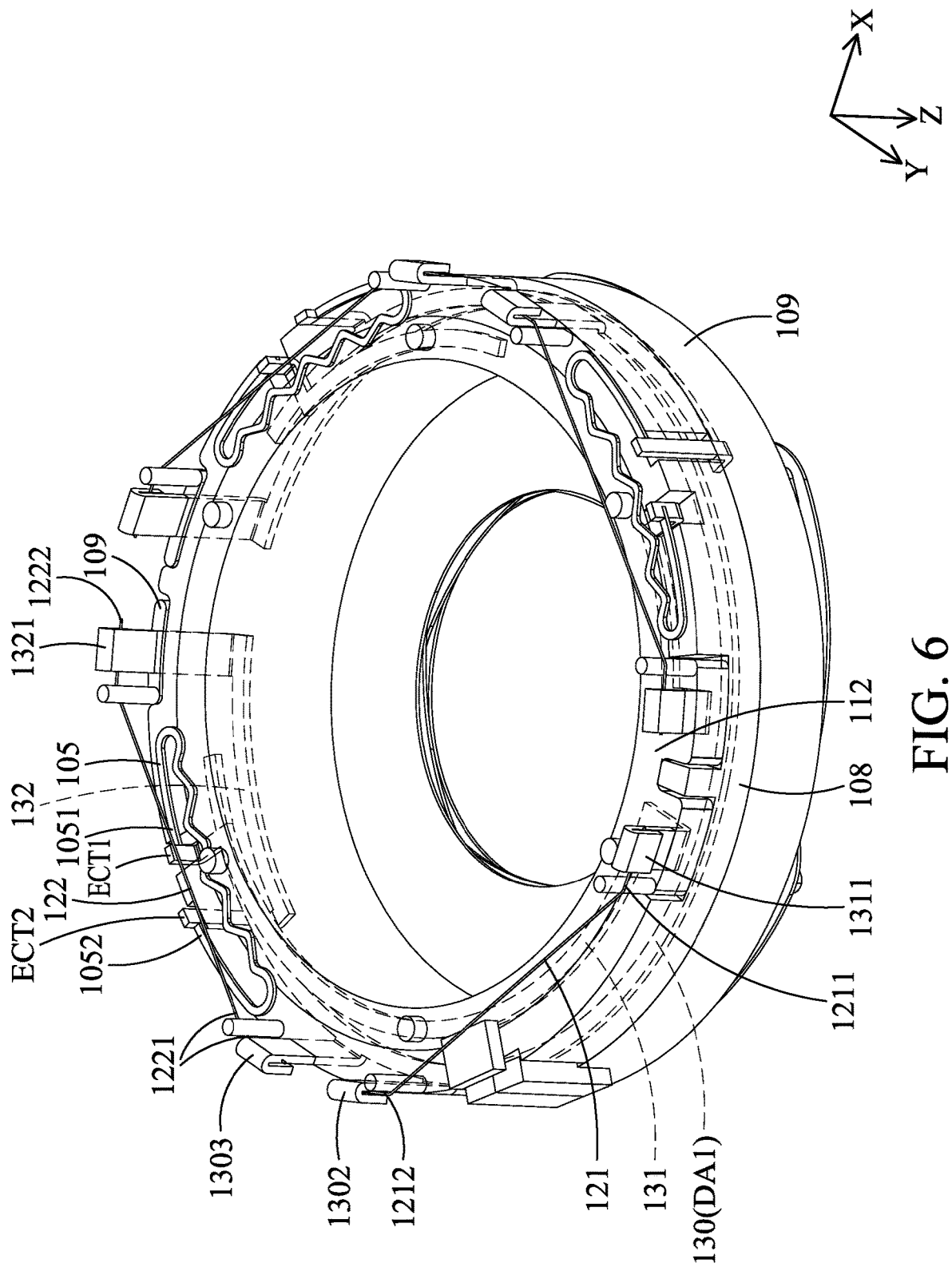
FIG. 6 is a bottom perspective view of a partial structure of the optical element driving mechanism 100 according to an embodiment of the present disclosure.
Figure 7:
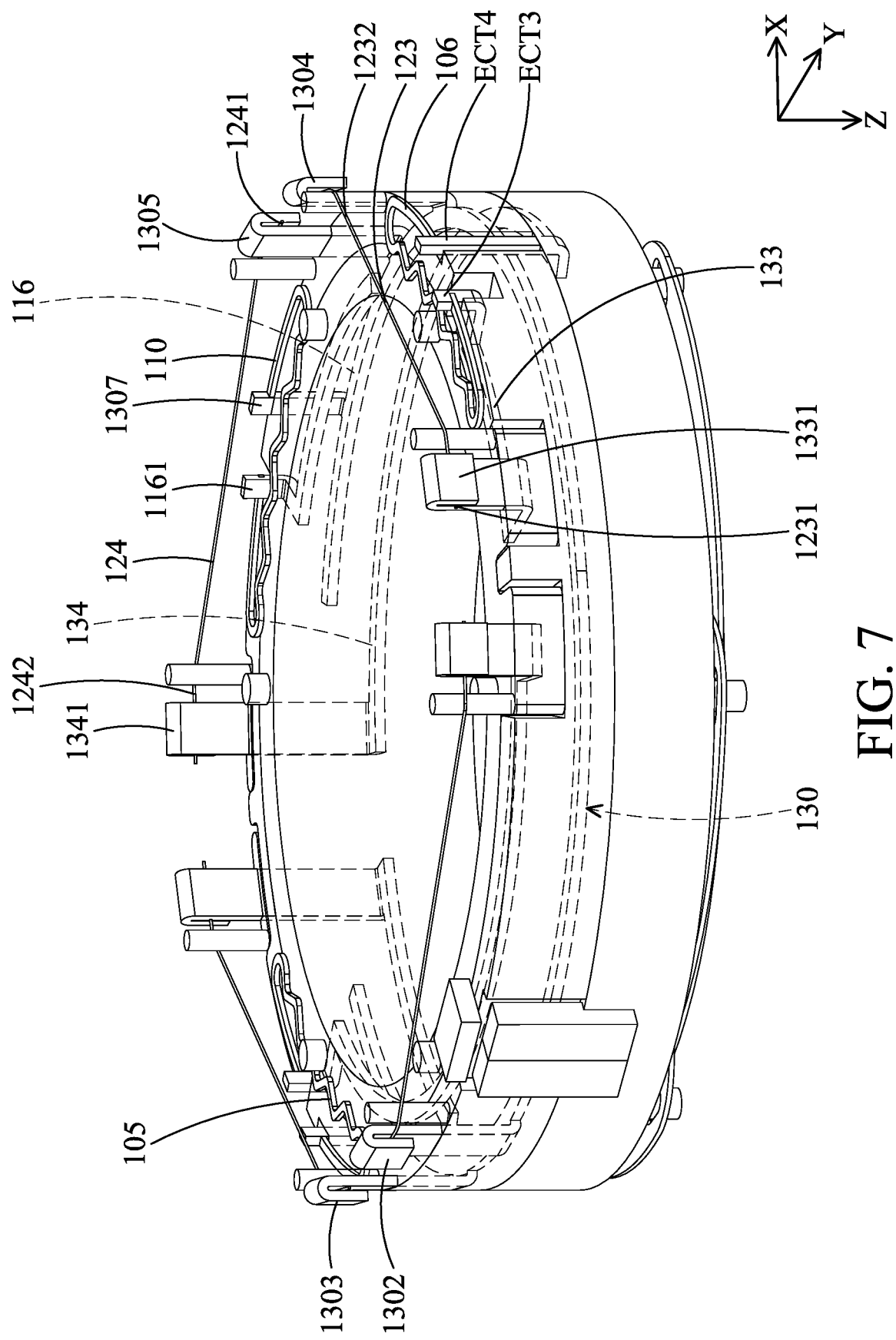
FIG. 7 is a perspective view of a partial structure of the optical element driving mechanism 100 in another view according to an embodiment of the present disclosure.

Next, please refer to FIG. 2, FIG. 6 and FIG. 7. FIG. 6 is a bottom perspective view of a partial structure of the optical element driving mechanism 100 according to an embodiment of the present disclosure, and FIG. 7 is a perspective view of a partial structure of the optical element driving mechanism 100 in another view according to an embodiment of the present disclosure. In this embodiment, the first driving assembly DA1 may include a first circuit member 131 disposed at the first base 112 of the fixed assembly FA.

Furthermore, the first driving assembly DA1 further includes a first driving element 121 and a grounding member 130. A first end 1211 of the first driving element 121 is affixed to a first connecting end 1311 of the first circuit member 131. The first connecting end 1311 is located at the first base 112 of the fixed assembly FA.

Similarly, a second end 1212 of the first driving element 121 is affixed to a second connecting end 1302 of the grounding member 130. The second connecting end 1302 is located at the first movable part 108.

The first driving assembly DA1 may further include a second circuit member 132 and a second driving element 122. The second circuit member 132 is disposed at the second movable part 109. A third end 1221 of the second driving element 122 is affixed to a third connecting end 1303 of the grounding member 130. The third connecting end 1303 is located at the first movable part 108.

Similarly, a fourth end 1222 of the second driving element 122 is affixed to a fourth connecting end 1321 of the second circuit member 132. The fourth connecting end 1321 is located at the second movable part 109.

As shown in FIG. 3, when viewed along the first axis AX1, the distance between the first connecting end 1311 and the fourth connecting end 1321 is greater than the distance between the second connecting end 1302 and the third connecting end 1303.

When viewed along the first axis AX1, the distance between the first connecting end 1311 and the third connecting end 1303 is greater than the distance between the second connecting end 1302 and the third connecting end 1303.

When viewed along the first axis AX1, the distance between the second connecting end 1302 and the fourth connecting end 1321 is greater than the distance between the second connecting end 1302 and the third connecting end 1303.

As shown in FIG. 3 and FIG. 7, the first driving assembly DA1 further includes a third circuit member 133 which is disposed at the first base 112 of the fixed assembly FA. The first driving assembly DA1 may further include a third driving element 123, a fifth end 1231 of the third driving element 123 is affixed to a fifth connecting end 1331 of the third circuit member 133, and the fifth connecting end 1331 is located at the first base 112 of the fixed assembly FA.

Similarly, a sixth end 1232 of the third driving element 123 is affixed to a sixth connecting end 1304 of the grounding member 130. The sixth connecting end 1304 is located at the first movable part 108.

Furthermore, the first driving assembly DA1 may further include a fourth circuit member 134 and a fourth driving element 124. The fourth circuit member 134 is disposed at the second movable part 109. A seventh end 1241 of the fourth driving element 124 is affixed to a seventh connecting end 1305 of the grounding member 130, and the seventh connecting end 1305 is located at the first movable part 108.

Similarly, an eighth end 1242 of the fourth driving element 124 is affixed to an eighth connecting end 1341 of the fourth circuit member 134, and the eighth connecting end 1341 is located at the second movable part 109.

As shown in FIG. 3, when viewed along the first axis AX1, the distance between the fifth connecting end 1331 and the eighth connecting end 1341 is greater than the distance between the sixth connecting end 1304 and the seventh connecting end 1305.

When viewed along the first axis AX1, the distance between the fifth connecting end 1331 and the seventh connecting end 1305 is greater than the distance between the sixth connecting end 1304 and the seventh connecting end 1305.

When viewed along the first axis AX1, the distance between the sixth connecting end 1304 and the eighth connecting end 1341 is greater than the distance between the sixth connecting end 1304 and the seventh connecting end 1305.

In this embodiment, as shown in FIG. 2, the optical element driving mechanism 100 may further include a circuit assembly 114 which is disposed on the first base 112 and electrically connected to the first driving assembly DA1. The circuit assembly 114 is, for example, a flexible printed circuit board (FPC board), but it is not limited thereto.

As shown in FIG. 3 and FIG. 6, the first circuit member 131 further has a first electrical connection terminal ECT1 which is electrically connected to the circuit assembly 114. Similarly, the second circuit member 132 has a second electrical connection terminal ECT2 which is electrically connected to the circuit assembly 114.

When the circuit assembly 114 provides power to the first circuit member 131 and the first driving element 121 through the first electrical connection terminal ECT1, the first driving element 121 shrinks to drive the first movable part 108 to rotate in a first rotating direction RX1 relative to the first base 112 of the fixed assembly FA.

Similarly, when the circuit assembly 114 provides power to the second circuit member 132 and the second driving element 122 through the second electrical connection terminal ECT2, the second driving element 122 shrinks to drive the second movable part 109 to rotates in the first rotating direction RX1 relative to the first movable part 108.

Similarly, as shown in FIG. 3 and FIG. 7, the third circuit member 133 further has a third electrical connection terminal ECT3 which is electrically connected to the circuit assembly 114, and the fourth circuit member 134 further has a fourth electrical connection terminal ECT4 which is electrically connected to the circuit assembly 114.

When the circuit assembly 114 provides power to the third circuit member 133 and the third driving element 123 through the third electrical connection terminal ECT3, the third driving element 123 shrinks to drive the first movable part 108 to rotate in a second rotating direction RX2 relative to the first base 112 of the fixed assembly FA. The second rotating direction RX2 is opposite to the first rotating direction RX1.

Furthermore, when the circuit assembly 114 provides power to the fourth circuit member 134 and the fourth driving element 124 through the fourth electrical connection terminal ECT4, the fourth driving element 124 shrinks to drive the second movable part 109 to rotate in the second rotating direction RX2 relative to the first movable part 108.

In this embodiment, the first driving element 121 to the fourth driving element 124 each have a linear structure and can be made of shape memory metal (Shape Memory Alloys, SMA), but they are not limited thereto.

Furthermore, in this embodiment, as shown in FIG. 6 and FIG. 7, portions of the first circuit member 131 and the third circuit member 133 are disposed inside the first base 112. For example, the first base 112 is made of plastic material, and these circuit members are formed in the first base 112 by insert molding technology.

Similarly, portions of the second circuit member 132 and the fourth circuit member 134 are disposed inside the second movable part 109. For example, the second movable part 109 is made of plastic material, and these circuit members are formed in the second movable part 109 by insert molding technology.

Figure 8:
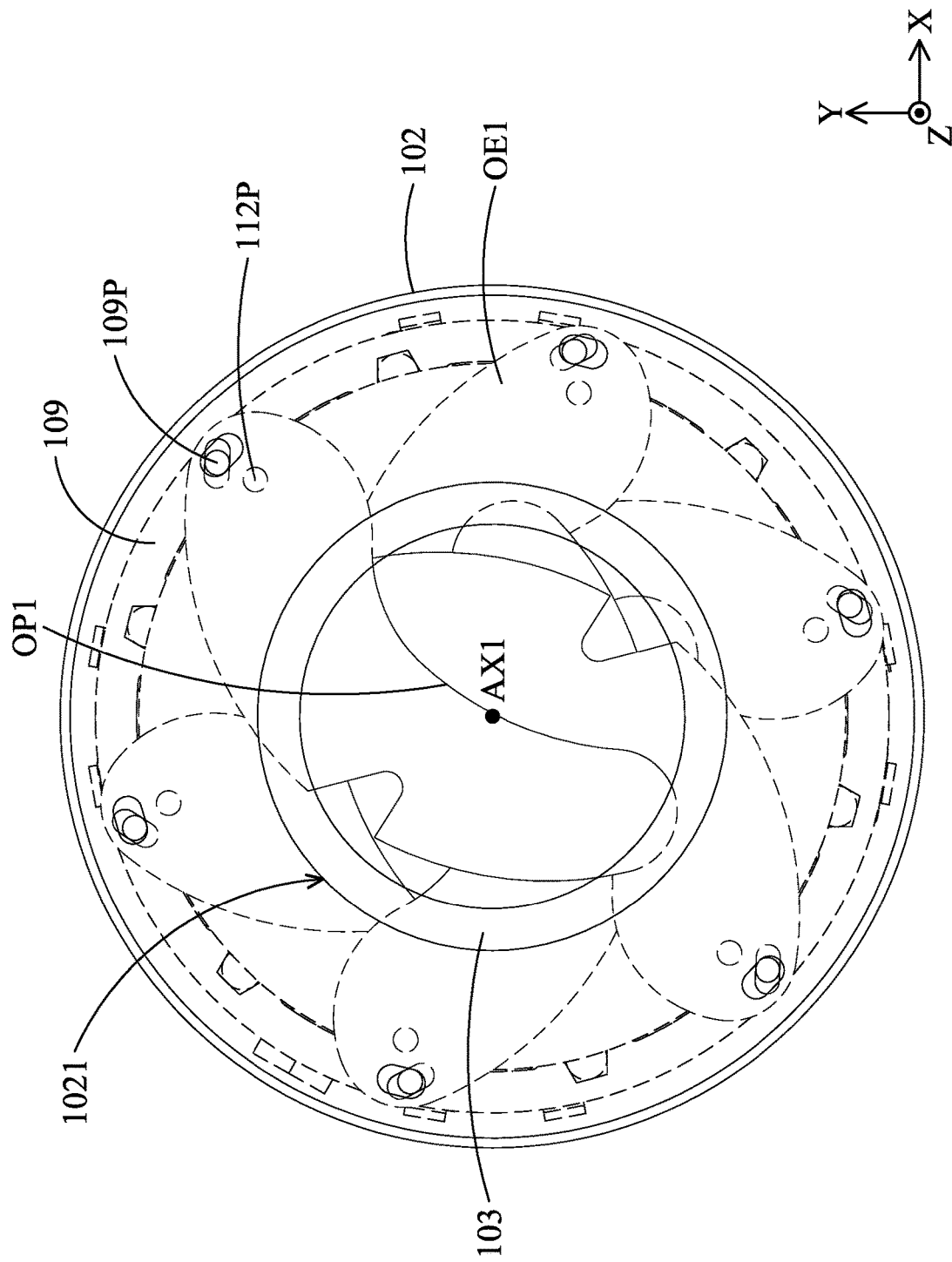
FIG. 8 is a top view illustrating that the first opening OP1 is closed and the opening 1021 is shielded according to an embodiment of the present disclosure.

Next, please refer to FIG. 3, FIG. 5 and FIG. 8. FIG. 8 is a top view illustrating that the first opening OP1 is closed and the opening 1021 is shielded according to an embodiment of the present disclosure. In this embodiment, the optical element driving mechanism 100 may further include a plurality of optical elements OE1. The optical elements OE1 are, for example, blades, but they are not limited thereto.

Correspondingly, a plurality of fixed columns 112P may be formed on the first base 112, and a plurality of driving columns 109P may be formed on the second movable part 109. The fixed columns 112P and the driving columns 109P pass through the corresponding optical elements OE1. When the first movable part 108 rotates in the first rotating direction RX1 relative to the first base 112, and the second movable part 109 rotates in the first rotating direction RX1 relative to the first movable part 108, the driving column 109P drives the corresponding optical element OE1 to rotate in the corresponding fixed column 112P to shield the opening 1021 of the casing 102, as shown in FIG. 8.

The first opening OP1 is defined by the plurality of optical elements OE1, and at this time the first opening OP1 can be minimized to block the light beam LT from entering the optical element driving mechanism 100.

On the other hand, when the first movable part 108 rotates in the second rotating direction RX2 relative to the first base 112, and the second movable part 109 rotates in the second rotating direction RX2 relative to the first movable part 108, the driving column 109P drives the corresponding optical element OE1 to rotate around the corresponding fixed column 112P, so that the first opening OP1 gradually enlarges, and finally as shown in FIG. 3.

Based on the above-mentioned control of the first movable part 108 and the second movable part 109 by the first driving assembly DA1, the size of the first opening OP1 can be adjusted to adjust the amount of light entering the optical element driving mechanism 100.

As shown in FIG. 2 to FIG. 3 and FIG. 6 to FIG. 7, in this embodiment, the optical element driving mechanism 100 may further include a preload assembly PA, and the preload assembly PA may include a first preload member 105 configured to generate a first preload force to the second movable part 109. As shown in FIG. 3, when the first driving assembly DA1 does not drive the second movable part 109 to move, the first preload force causes the second movable part 109 to be located in a second initial position in FIG. 8. At this time, the first opening OP1 is fully closed.

In this embodiment, as shown in FIG. 3, one end portion 1051 of the first preload member 105 is connected to the first electrical connection terminal ECT1, and the other end portion 1052 of the first preload member 105 is connected to the second electrical connection terminal ECT2.

Similarly, the preload assembly PA may further include a second preload member 106 configured to generate a second preload force to the second movable part 109. When the first driving assembly DA1 does not drive the second movable part 109 to move, the second preload force causes the second movable part 109 to be located in a second initial position in FIG. 8. At this time, the first opening OP1 is fully closed.

In this embodiment, as shown in FIG. 3, one end portion 1061 of the second preload member 106 is connected to the third electrical connection terminal ECT3, and the other end portion 1062 of the second preload member 106 is connected to the fourth electrical connection terminal ECT4.

When it is desired to open the first opening OP1, the second movable part 109 is driven to rotate in the second rotating direction RX2, the first preload member 105 and the second preload member 106 are squeezed to increase the first preload force and the second preload force. Then, when the circuit assembly 114 stops supplying power to the first driving element 121 and the second driving element 122, the first preload force and the second preload force (the elastic force) may drive the second movable part 109 to rotate in the first rotating direction RX1 to quickly to return to the second initial position.

Similarly, the preload assembly PA further includes a third preload member 110 configured to generate a third preload force to the first movable part 108. When the first driving assembly DA1 does not drive the first movable part 108 to move, the third preload force causes the first movable part 108 to be located in a first initial position in FIG. 8. At this time, the first opening OP1 is fully closed.

When it is desired to open the first opening OP1, the first movable part 108 is driven to rotate in the second rotating direction RX2, the third preload member 110 is squeezed to increase the third preload force. Then when the circuit assembly 114 stops supplying power to the first driving element 121 and the second driving element 122, the third preload force (the elastic force) drives the first movable part 108 to rotate in the first rotating direction RX1 to quickly to return to the first initial position.

In addition, as shown in FIG. 7, the fixed assembly FA further includes a fixed member 116. The fixed member 116 is located at the first base 112. One end portion 1101 of the third preload member 110 is connected to a first elastic connecting end 1307 of the grounding member 130, and the other end portion 1102 of the third preload member 110 is connected to a second elastic connecting end 1161 of the fixed member 116.

In this embodiment, the first preload member 105, the second preload member 106 and the third preload member 110 each have a plate-shaped structure. Each of the first preload member 105, the second preload member 106 and the third preload member 110 is an elastic spring sheet, but they are not limited thereto.

In this embodiment, as shown in FIG. 3 and FIG. 6, the first connecting end 1311, the first driving element 121 and the second connecting end 1302 may form a first circuit loop. The fourth connecting end 1321, the second driving element 122 and the third connecting end 1303 may form a second circuit loop.

In this embodiment, the first preload member 105 can be made of metal material, so that the first electrical connection terminal ECT1 of the first circuit member 131 is electrically connected to the second electrical connection terminal ECT2 of the second circuit member 132 through the first preload member 105. That is, the first circuit loop is electrically connected to the second circuit loop, but it is not limited thereto.

For example, in other embodiments, the first circuit loop is electrically independent of the second circuit loop. That is, the first driving assembly DA1 can drive the first driving element 121 or the second driving element 122 individually.

Similarly, as shown in FIG. 3 and FIG. 7, the fifth connecting end 1331, the third driving element 123 and the sixth connecting end 1304 form a third circuit loop, and the eighth connecting end 1341, the fourth driving element 124 and the seventh connecting end 1305 form a fourth circuit loop.

In this embodiment, the second preload member 106 is made of metal material, so that the third electrical connection terminal ECT3 of the third circuit member 133 is electrically connected to the fourth electrical connection terminal ECT4 of the fourth circuit member 134 through the second preload member 106. That is, the third circuit loop is electrically connected to the fourth circuit loop, but it is not limited thereto.

In addition, the third preload member 110 can also be made of metal material, and the third preload member 110 is electrically independent of the first preload member 105 and the second preload member 106.

Figure 9:
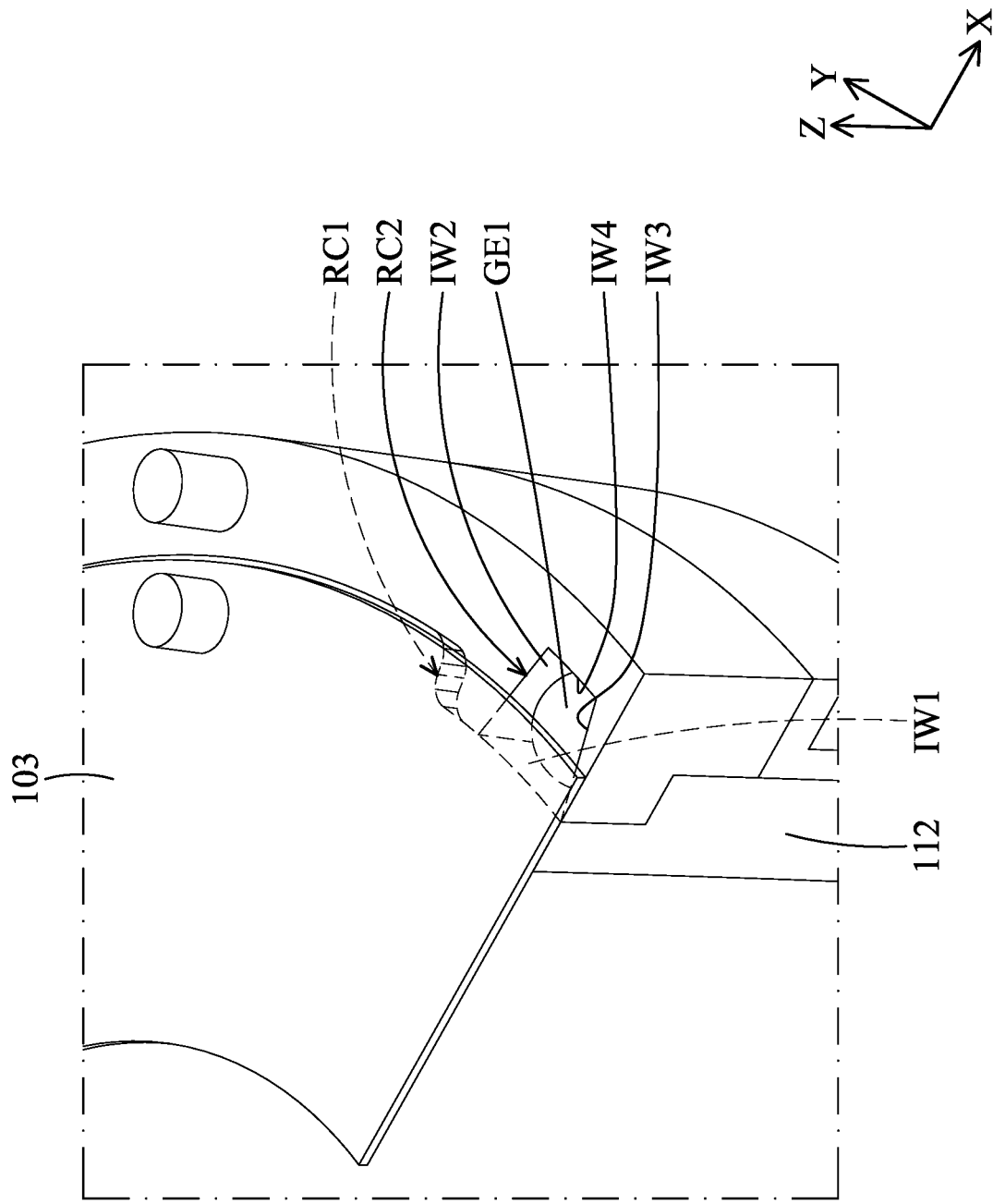
FIG. 9 is a perspective cross-sectional view of a partial structure of the optical element driving mechanism 100 according to an embodiment of the present disclosure.

Next, please refer to FIG. 2, FIG. 5 and FIG. 9. FIG. 9 is a perspective cross-sectional view of a partial structure of the optical element driving mechanism 100 according to an embodiment of the present disclosure. In this embodiment, the optical element driving mechanism 100 further includes a guiding assembly GA configured to guide the second movable part 109 to move relative to the first base 112.

The first base 112 has at least one first groove RC1, and the second movable part 109 has at least one second groove RC2. The guiding assembly GA has at least one first guiding member GE1, which is disposed between the corresponding first groove RC1 and second groove RC2. In this embodiment, the first guiding member GE1 has a spherical structure, but it is not limited thereto.

As shown in FIG. 5 and FIG. 9, the first guiding member GE1 is configured to contact the first inner wall IW1 of the first groove RC1 and the second inner wall IW2, the third inner wall IW3 and a fourth inner wall IW4 of the second groove RC2.

As shown in FIG. 5, when viewed along the first axis AX1, the size of the first groove RC1 is different from the size of the second groove RC2. Specifically, when viewed along the first axis AX1, the size of the first groove RC1 is larger than the size of the second groove RC2.

When viewed along the first axis AX1, a portion of the second groove RC2 is located within the first groove RC1. Furthermore, the optical element driving mechanism 100 may further include a covering plate 103 fixedly disposed on the first base 112. When viewed along the first axis AX1 (the Z-axis), the covering plate 103 overlaps at least a portion of the first guiding member GE1.

Based on the above structural configuration, it can be ensured that when the first guiding member GE1 guides the second movable part 109 to rotate relative to the first base 112, the first guiding member GE1 will not separate from the first groove RC1 or the second groove RC2.

Figure 10:
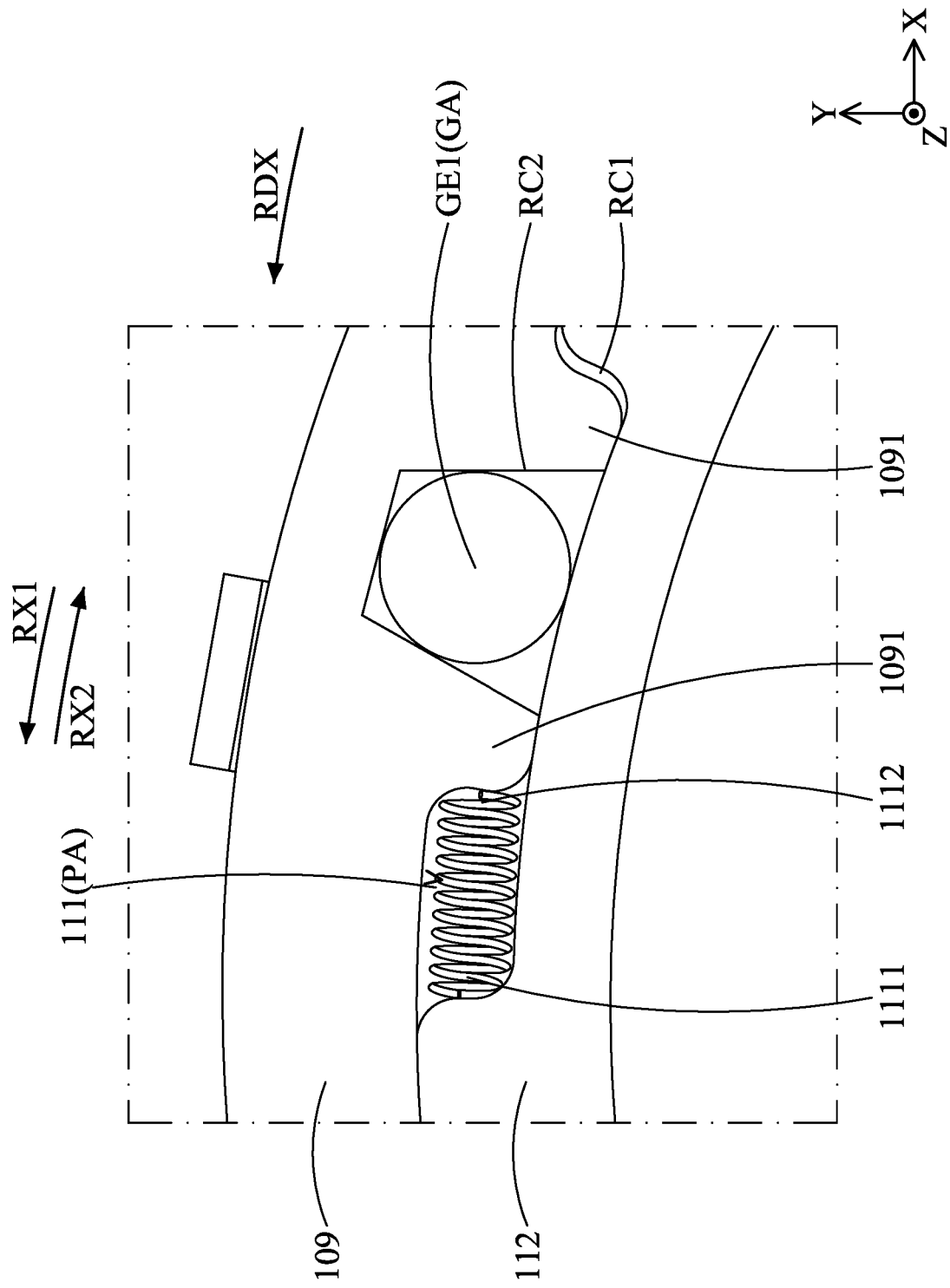
FIG. 10 is an enlarged view of a partial structure of the optical element driving mechanism 100 according to another embodiment of the present disclosure.

Next, please refer to FIG. 10, which is an enlarged view of a partial structure of the optical element driving mechanism 100 according to another embodiment of the present disclosure. In this embodiment, the preload assembly PA may further include a fourth preload member 111. The fourth preload member 111 has a spiral structure. For example, the fourth preload member 111 is a spring, but it is not limited to this.

As shown in FIG. 10, the fourth preload member 111 is disposed in the first groove RC1 and adjacent to the first guiding member GE1. For example, the second movable part 109 has two first protruding portions 1091 extending toward the first base 112, and the second groove RC2 is formed by the two first protruding portions 1091.

One end portion 1111 of the fourth preload member 111 is in contact with the first base 112, and the other end portion 1112 of the fourth preload member 111 is in contact with one of the two first protruding portions 1091 (the first protruding portion 1091 on the left in FIG. 10).

When the second movable part 109 is driven to rotate in the first rotating direction RX1, the fourth preload member 111 is squeezed to increase the fourth preload force. When the circuit assembly 114 stops supplying power to the second driving element 122, the fourth preload force (the elastic force) can be applied to the first protruding portion 1091 so that the second movable part 109 may quickly return to the second initial position.

As shown in FIG. 10, when viewed in a direction perpendicular to the first axis AX1 (the Z-axis), for example, when viewed along a circumferential direction RDX defined by the first base 112, the fourth preload member 111 overlaps at least portion of the guiding assembly GA.

That is, when viewed in a direction perpendicular to the first axis AX1 (along the circumferential direction RDX), the fourth preload member 111 overlaps at least a portion of the first guiding member GE1. Based on this structural configuration, not only can the second movable part 109 be quickly returned to the second initial position, but also the purpose of miniaturization can be achieved.

Figure 11:
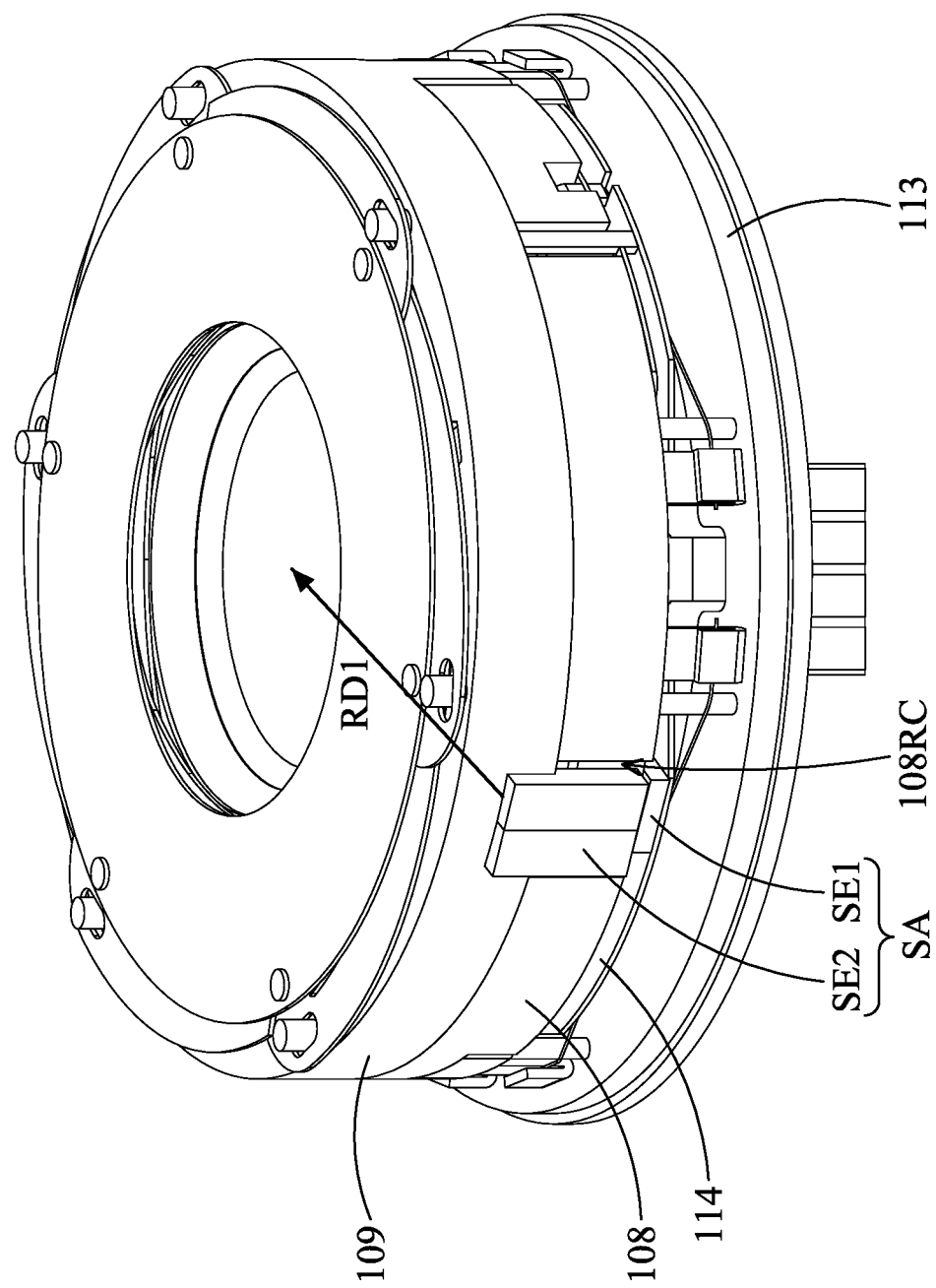
FIG. 11 is a perspective view of a partial structure of the optical element driving mechanism 100 according to an embodiment of the present disclosure.

Next, please refer to FIG. 2 and FIG. 11. FIG. 11 is a perspective view of a partial structure of the optical element driving mechanism 100 according to an embodiment of the present disclosure. In this embodiment, the optical element driving mechanism 100 may further include a sensing assembly SA configured to sense the movement of the movable assembly MA relative to the fixed assembly FA.

The sensing assembly SA includes a first sensing element SE1 and a second sensing element SE2. The first sensing element SE1 is fixedly disposed on the circuit assembly 114, and the circuit assembly 114 is fixedly disposed on the first base 112.

The second sensing element SE2 is fixedly disposed on the second movable part 109, and the first sensing element SE1 is configured to sense changes of the second sensing element SE2, thereby sensing the position of the second movable part 109 relative to the first base 112. In this embodiment, the first sensing element SE1 can be a Hall sensor, and the second sensing element SE2 can be a Hall magnet, but they are not limited thereto.

As shown in FIG. 11, when viewed along a radial direction RD1, the first movable part 108 can form a first receiving groove 108RC configured to accommodate the second sensing element SE2. When viewed along the radial direction RD1, the size of the first receiving groove 108RC is larger than the size of the second sensing element SE2.

The present disclosure provides an optical element driving mechanism 100, which includes a fixed assembly FA, a movable assembly MA, a first driving assembly DA1, and a plurality of optical elements OE1 (the blades). The movable assembly MA includes a first movable part 108 and a second movable part 109, and the first driving assembly DA1 is configured to drive the first movable part 108 to move relative to the first base 112, and to drive the second movable part 109 to move relative to the first movable part 108 so as to drive the optical elements OE1 to rotate to adjust the amount of the light beam LT entering the optical element driving mechanism 100.

The first driving element 121 and the second driving element 122 are configured to drive the first movable part 108 and the second movable part 109 to rotate in the first rotating direction RX1. The first driving element 121 and the second driving element 122 can be controlled simultaneously or separately. When they are controlled separately, the first opening OP1 can be closed in stages. Similarly, the third driving element 123 and the fourth driving element 124 are configured to drive the first movable part 108 and the second movable part 109 to rotate in the second rotating direction RX2. When the third driving element 123 and the fourth driving element 124 are controlled separately, the first opening OP1 can be opened in stages.

In addition, the first movable part 108 is stacked on the second movable part 109 along the first axis AX1, and when viewed along the first axis AX1, the first movable part 108 and the second movable part 109 surround a portion of the first base 112, so that the optical element driving mechanism 100 can further achieve the purpose of miniaturization. Furthermore, one or more spherical first guiding members GE1 can be disposed between the second movable part 109 and the first base 112, so that the second movable part 109 can rotate more smoothly relative to the first movable part 108 and the first base 112.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
    a fixed assembly, including a side wall;
    a movable assembly, including a first movable part and a second movable part, configured to be connected to an optical element, wherein the movable assembly is movable relative to the fixed assembly; and
    a first driving assembly, configured to drive the movable assembly to move relative to the fixed assembly;
    wherein the optical element driving mechanism further comprises a first opening, and an external light beam travels along a first axis to pass through the first opening;
    the first movable part has a first ring structure, forming a second opening;
    the first ring structure surrounds the side wall;
    the second movable part has a second ring structure, forming a third opening;
    the second movable part further has a first protruding portion extending from the second ring structure toward the side wall; and
    when viewed along the first axis, a portion of the first protruding portion does not overlap the first movable part.

2. The optical element driving mechanism as claimed in claim 1, wherein
    the side wall extends along the first axis;
    the side wall is adjacent to the first opening;
    the first movable part is adjacent to the side wall; and
    the second movable part is adjacent to the side wall.

3. The optical element driving mechanism as claimed in claim 2, wherein
    the first movable part is movable relative to the fixed assembly;
    the second movable part is movable relative to the first movable part;
    the second movable part is movable relative to the fixed assembly;
    when viewed along the first axis, the first movable part overlaps at least a portion of the second movable part; and
    when viewed along the first axis, the side wall surrounds the first opening.

4. The optical element driving mechanism as claimed in claim 3, wherein
    the light beam passes through the second opening;
    when viewed along the first axis, the second opening and an opening center of the first opening define a first shortest distance;
    the light beam passes through the third opening;
    when viewed along the first axis, the third opening and the opening center define a second shortest distance;
    the first shortest distance is different from the second shortest distance; and
    the first shortest distance is greater than the second shortest distance.

5. The optical element driving mechanism as claimed in claim 4, wherein
    the first driving assembly includes a first circuit member which is disposed at the fixed assembly;
    the first driving assembly further includes a first driving element and a grounding member;
    a first end of the first driving element is affixed to a first connecting end of the first circuit member;
    the first connecting end is located at the fixed assembly;
    a second end of the first driving element is affixed to a second connecting end of the grounding member; and
    the second connecting end is located at the first movable part.

6. The optical element driving mechanism as claimed in claim 5, wherein
    the first driving assembly further includes a second circuit member and a second driving element;
    the second circuit member is disposed at the second movable part;
    a third end of the second driving element is affixed to a third connecting end of the grounding member;
    the third connecting end is located at the first movable part;
    a fourth end of the second driving element is affixed to a fourth connecting end of the second circuit member; and
    the fourth connecting end is located at the second movable part.

7. The optical element driving mechanism as claimed in claim 6, wherein
when viewed along the first axis, a distance between the first connecting end and the fourth connecting end is greater than a distance between the second connecting end and the third connecting end;
when viewed along the first axis, a distance between the first connecting end and the third connecting end is greater than the distance between the second connecting end and the third connecting end; and
when viewed along the first axis, a distance between the second connecting end and the fourth connecting end is greater than the distance between the second connecting end and the third connecting end.

8. The optical element driving mechanism as claimed in claim 7, wherein
the first driving assembly further includes a third circuit member which is disposed at the fixed assembly;
the first driving assembly further includes a third driving element;
a fifth end of the third driving element is affixed to a fifth connecting end of the third circuit member;
the fifth connecting end is located at the fixed assembly;
a sixth end of the third driving element is affixed to a sixth connecting end of the grounding member; and
the sixth connecting end is located at the first movable part.

9. The optical element driving mechanism as claimed in claim 8, wherein
the first driving assembly further includes a fourth circuit member and a fourth driving element;
the fourth circuit member is disposed at the second movable part;
a seventh end of the fourth driving element is affixed to a seventh connecting end of the grounding member;
the seventh connecting end is located at the first movable part;
an eighth end of the fourth driving element is affixed to an eighth connecting end of the fourth circuit member; and
the eighth connecting end is located at the second movable part.

10. The optical element driving mechanism as claimed in claim 9, wherein
when viewed along the first axis, a distance between the fifth connecting end and the eighth connecting end is greater than a distance between the sixth connecting end and the seventh connecting end;
when viewed along the first axis, a distance between the fifth connecting end and the seventh connecting end is greater than the distance between the sixth connecting end and the seventh connecting end; and
when viewed along the first axis, a distance between the sixth connecting end and the eighth connecting end is greater than the distance between the sixth connecting end and the seventh connecting end.

11. The optical element driving mechanism as claimed in claim 10, wherein
the optical element driving mechanism further includes a circuit assembly which is electrically connected to the first driving assembly;
the first circuit member further has a first electrical connection terminal which is electrically connected to the circuit assembly;
the second circuit member further has a second electrical connection terminal which is electrically connected to the circuit assembly;
when the circuit assembly provides power to the first circuit member and the first driving element through the first electrical connection terminal, the first driving element drives the first movable part to rotate in a first rotating direction relative to the fixed assembly; and
when the circuit assembly provides power to the second circuit member and the second driving element through the second electrical connection terminal, the second driving element drives the second movable part to rotate in the first rotating direction relative to the first movable part.

12. The optical element driving mechanism as claimed in claim 11, wherein
the third circuit member further has a third electrical connection terminal which is electrically connected to the circuit assembly;
the fourth circuit member further has a fourth electrical connection terminal which is electrically connected to the circuit assembly;
when the circuit assembly provides power to the third circuit member and the third driving element through the third electrical connection terminal, the third driving element drives the first movable part to rotate in a second rotating direction relative to the fixed assembly;
the second rotating direction is opposite to the first rotating direction; and
when the circuit assembly provides power to the fourth circuit member and the fourth driving element through the fourth electrical connection terminal, the fourth driving element drives the second movable part to rotate in the second rotating direction relative to the first movable part.

13. The optical element driving mechanism as claimed in claim 12, wherein
the optical element driving mechanism further includes a preload assembly, and the preload assembly includes a first preload member configured to generate a first preload force to the second movable part;
when the first driving assembly does not drive the second movable part to move, the first preload force causes the second movable part to be located in a second initial position;
one end portion of the first preload member is connected to the first electrical connection terminal;
the other end portion of the first preload member is connected to the second electrical connection terminal;
the preload assembly further includes a second preload member configured to generate a second preload force to the second movable part;
when the first driving assembly does not drive the second movable part to move, the second preload force causes the second movable part to be located in the second initial position;
one end portion of the second preload member is connected to the third electrical connection terminal;
the other end portion of the second preload member is connected to the fourth electrical connection terminal;
the preload assembly further includes a third preload member configured to generate a third preload force to the first movable part;
when the first driving assembly does not drive the first movable part to move, the third preload force causes the first movable part to be located in a first initial position;
the fixed assembly further includes a first base and a fixed member;
the fixed member is located at the first base;

one end portion of the third preload member is connected to a first elastic connecting end of the ground member;

the other end portion of the third preload member is connected to a second elastic connecting end of the fixed member;

the first preload member, the second preload member and the third preload member each have a plate-shaped structure; and each of the first preload member, the second preload member and the third preload member is an elastic spring sheet.

14. The optical element driving mechanism as claimed in claim 13, wherein the first connecting end, the first driving element and the second connecting end form a first circuit loop;

the fourth connecting end, the second driving element and the third connecting end form a second circuit loop;

the first preload member is made of metal material;

the first electrical connection terminal of the first circuit member is electrically connected to the second electrical connection terminal of the second circuit member through the first preload member;

the fifth connecting end, the third driving element and the sixth connecting end form a third circuit loop;

the eighth connecting end, the fourth driving element and the seventh connecting end form a fourth circuit loop;

the second preload member is made of metal material;

the third electrical connection terminal of the third circuit member is electrically connected to the fourth electrical connection terminal of the fourth circuit member through the second preload member;

the third preload member is made of metal material; and the third preload member is electrically independent of the first preload member and the second preload member.

15. The optical element driving mechanism as claimed in claim 13, wherein the optical element driving mechanism further includes a guiding assembly configured to guide the second movable part to move relative to the first base;

the first base has a first groove;

the second movable part has a second groove;

the guiding assembly has a first guiding member which is disposed between the first groove and the second groove; and the first guiding member has a spherical structure.

16. The optical element driving mechanism as claimed in claim 15, wherein the first guiding member is configured to contact a first inner wall of the first groove and a second inner wall, a third inner wall and a fourth inner wall of the second groove;

a size of the first groove is different from a size of the second groove when viewed along the first axis;

when viewed along the first axis, the size of the first groove is larger than the size of the second groove;

when viewed along the first axis, a portion of the second groove is located within the first groove;

the optical element driving mechanism further includes a covering plate which is fixedly disposed on the first base; and when viewed along the first axis, the covering plate overlaps at least a portion of the first guiding member.

17. The optical element driving mechanism as claimed in claim 16, wherein the preload assembly further includes a fourth preload member;

the fourth preload member has a spiral structure;

the fourth preload member is disposed in the first groove and adjacent to the first guiding member;

the second movable part has two first protruding portions extending toward the first base;

the second groove is formed by the two first protruding portions;

one end portion of the fourth preload member is in contact with the first base, and the other end portion of the fourth preload member is in contact with one of the two first protruding portions;

when viewed in a direction perpendicular to the first axis, the fourth preload member overlaps at least a portion of the guiding assembly; and when viewed a direction perpendicular to the first axis, the fourth preload member overlaps at least a portion of the first guiding member.

18. The optical element driving mechanism as claimed in claim 13, wherein the optical element driving mechanism further includes a sensing assembly configured to sense movement of the movable assembly relative to the fixed assembly;

the sensing assembly includes a first sensing element and a second sensing element;

the first sensing element is fixedly disposed on the circuit assembly;

the circuit assembly is fixedly disposed on the first base;

the second sensing element is fixedly disposed on the second movable part; and the first sensing element is configured to sense changes of the second sensing element.

19. The optical element driving mechanism as claimed in claim 18, wherein when viewed along a radial direction, the first movable part forms a first receiving groove configured to accommodate the second sensing element; and when viewed along the radial direction, a size of the first receiving groove is larger than a size of the second sensing element.

* * * * *